W. K. KIGHT.
PROTECTING DEVICE FOR AUTOMOBILE TIRES.
APPLICATION FILED OCT. 8, 1919.

1,406,655.

Patented Feb. 14, 1922.
3 SHEETS—SHEET 1.

Inventor
William K. Kight
By his Attorney

W. K. KIGHT.
PROTECTING DEVICE FOR AUTOMOBILE TIRES.
APPLICATION FILED OCT. 8, 1919.

1,406,655.

Patented Feb. 14, 1922.

Inventor
William K. Kight
By his Attorney

Inventor
William K. Kight.
By his Attorney

UNITED STATES PATENT OFFICE.

WILLIAM K. KIGHT, OF DEXTER, MISSOURI, ASSIGNOR OF ONE-SIXTH TO WILLIAM H. JINKS AND ONE-SIXTH TO LEO B. JESSUP, BOTH OF BROOKLAND, ARKANSAS.

PROTECTING DEVICE FOR AUTOMOBILE TIRES.

1,406,655. Specification of Letters Patent. Patented Feb. 14, 1922.

Application filed October 8, 1919. Serial No. 329,197.

*To all whom it may concern:*

Be it known that I, WILLIAM K. KIGHT, a citizen of the U. S., residing at Dexter, county of Stoddard, and State of Missouri, have invented certain new and useful Improvements in Protecting Devices for Automobile Tires, of which the following is a specification.

This invention relates to a protecting device for automobile tires, being primarily intended for application to pneumatic tires with which practically all automobiles are equipped.

The invention has for an object to provide a simple and inexpensive protecting device which may be easily applied to any automobile tire without requiring any changes or alterations in the structure thereof, or in the wheel on which the tire is mounted, and which will adequately protect the tire against wear and puncture, while at the same time fully preserving the resiliency thereof.

For further comprehension of the invention, and of the objects and advantages thereof, reference will be had to the following description and accompanying drawings, and to the appended claims in which the various novel features of the invention are more particularly set forth.

Figure 1 of the drawings is an edge view of an automobile wheel equipped with the invention.

Figure 1:
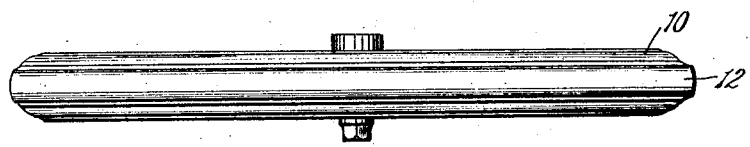
Figure 2:
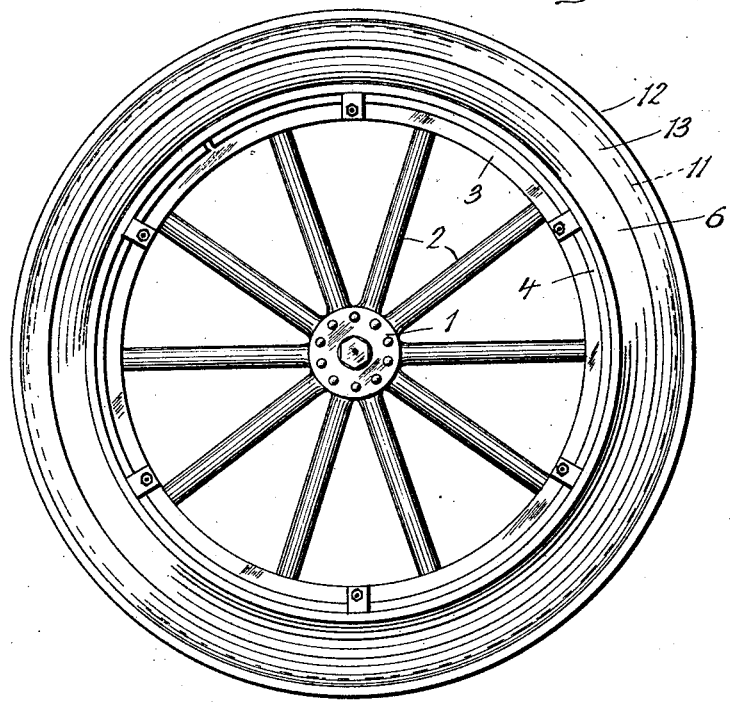
Figure 2 is a side view thereof.
Figure 3:
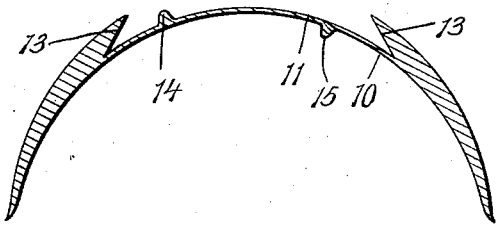
Figure 3 is a detail transverse section of the metal protecting ring.
Figure 4:
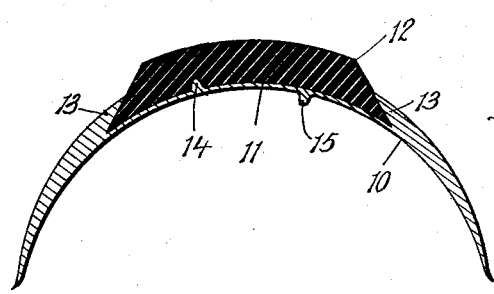
Figure 4 is a similar view showing the rubber tread member in place.
Figure 5:
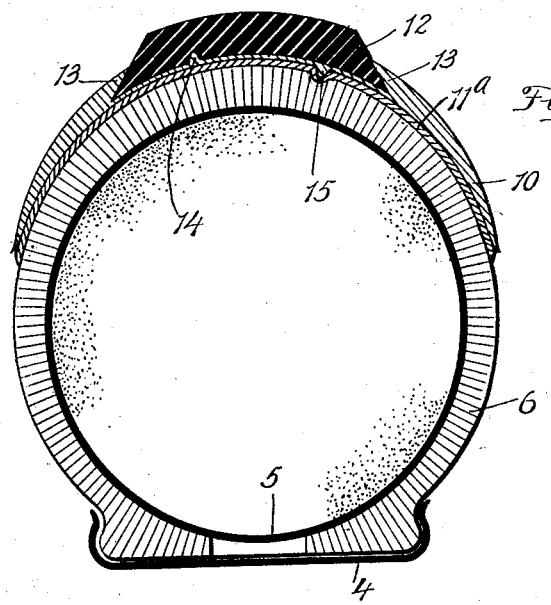
Figure 5 is a transverse section of the tire with the protecting device in place.
Figure 6:
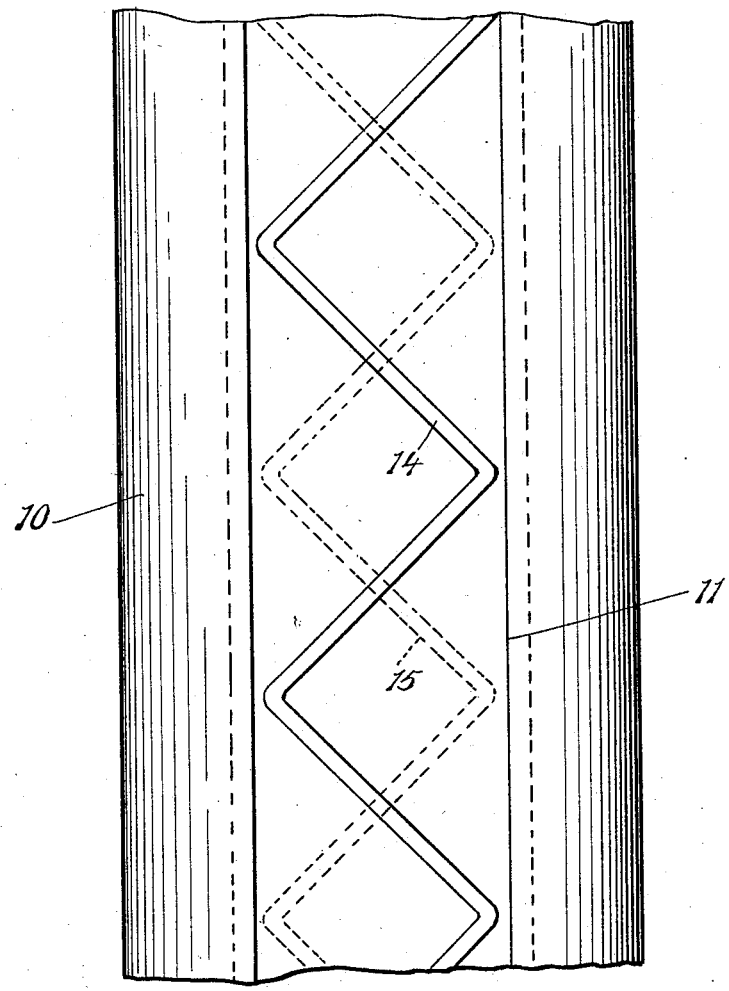
Figure 6 is a fragmentary face view of the metal protecting ring.

In the drawings, 1 indicates the hub of an automobile wheel, 2 the spokes, 3 the wooden felly, 4 the metal rim, 5 the inner tube of the tire, and 6 the outer tube, these parts being all of ordinary construction and being shown simply to illustrate the application of the invention.

My improved protecting devices comprises a metal ring or band 10 of substantially semi-circular shape in cross section so as to fit snugly on the tire 6. This ring is forced over the tire when the latter is deflated and is of a diameter to tightly press upon the tire when the latter is inflated, a lining 11$^a$ of asbestos being interposed between the ring and the tire so as to prevent heat which may be generated in the metal ring from affecting the tire.

This ring is formed with a peripheral groove 11 extending therearound to receive a rubber tread member 12, the side walls 13 of the groove and tread member being inwardly inclined to cause the latter to be securely held in position, while the ring preferably tapers in thickness from the sides of said grooves to the side edges of the ring.

Upon the bottom wall of the groove 11 is formed a projecting rib 14 this rib extending in zig-zag fashion completely around the ring. Upon the inner face of the ring is formed a similar rib 15 likewise extending in zig-zag fashion completely around the ring. These ribs serve to prevent creeping of the tread member 12 upon the ring, and of the latter upon the tire.

It will be observed that the members which compose the ribs of one of the series alternate with those of the other series, or in other words, are circumferentially offset. This arrangement provides an even distribution or balancing of the strain at the points of engagement of the ribs with the tube 6 and the flexible tread member 12.

As will be apparent the protecting device will be held firmly in position when the tire is inflated, and since it is engaged by no other part than the tire and can move freely with the latter to accommodate itself to compression of the air therein, it does not act to lessen the resiliency or cushioning effect of the tire.

While I prefer to form the ring or band of a suitable metal such as steel, or an aluminum alloy, it must be understood that I include within the scope of my invention the use of any other material suitable for the purpose.

Having thus described my invention what

I claim as new and desire to secure by Letters Patent, is:—

1. A tire protecting device comprising a metallic ring of semi-circular cross section, said ring increasing in thickness from the edges toward the centre and having a peripheral groove extending around said thickened central portion, the side walls of said groove inclining inwardly toward one another and the bottom of said groove being curved transversely in correspondence to the inner surface of the ring, a flexible tread member having its sides inclined in correspondence to the side walls of the groove and extending outwardly beyond the latter, and projecting ribs formed on opposite faces of said ring adjacent the said groove, and extending in zig-zag fashion around the ring, and entering respectively, the tread of the tube and the inner face of the flexible tread member.

2. A tire protecting device, comprising in combination with the tire, a transversely semi-circular metallic ring having an outer peripheral, laterally undercut groove, arcuate in transverse section, a flexible tread member carried in said groove, the bottom wall of said groove and the inner face of said ring being each provided with a series of ribs extending in zig-zag formation circumferentially thereof, the ribs of one of said series being circumferentially displaced with relation to those of the other series.

3. A tire protecting device comprising a metallic ring arcuate in transverse section, a flexible tread carried by said ring, said ring having an inner and outer circumferential series of ribs arranged in zig-zag formation, the ribs of one of said series being longitudinally offset with relation to those of the other series.

In testimony whereof I have affixed my signature.

WILLIAM K. KIGHT.